Figure 1:
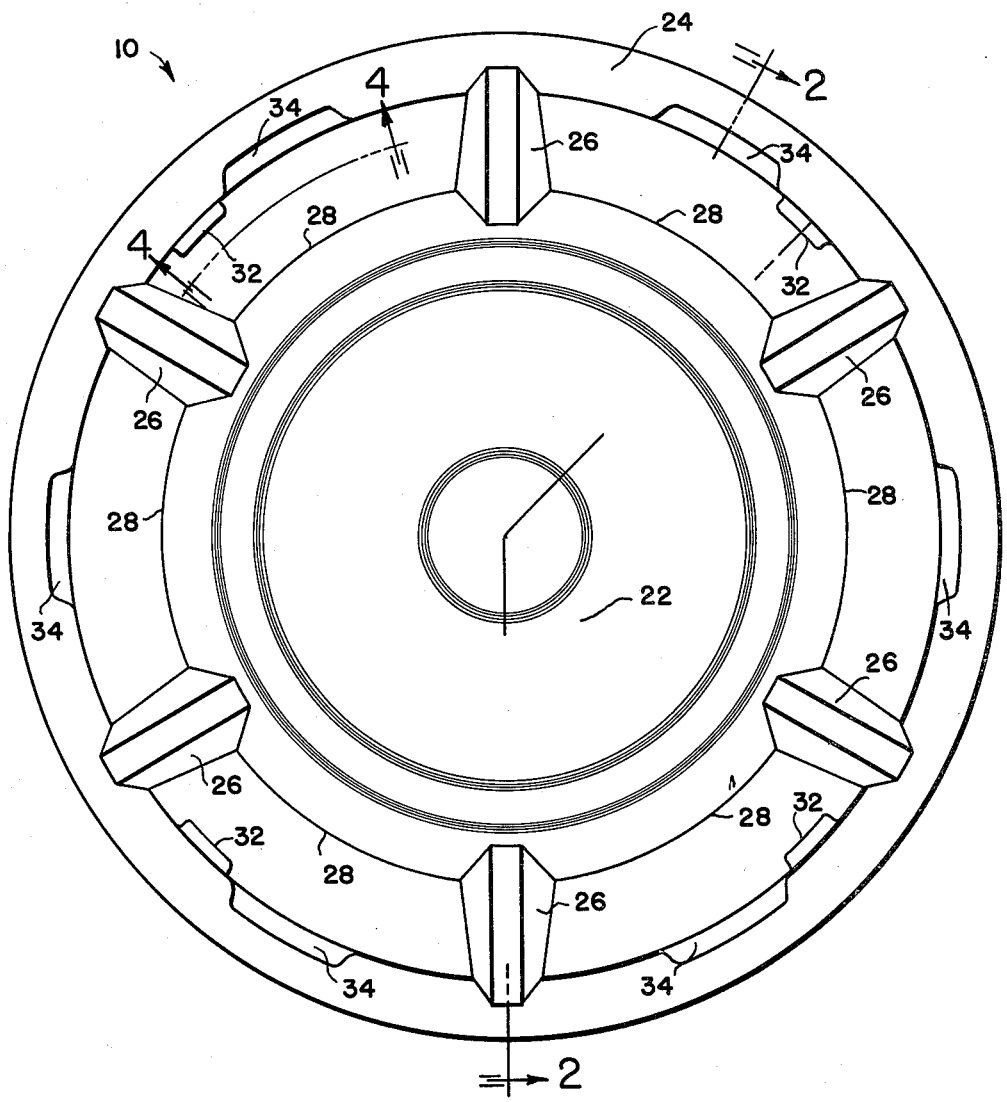

April 24, 1962     H. F. DIES     3,031,232
WHEEL COVER

Filed Nov. 12, 1958     2 Sheets-Sheet 1

INVENTOR.
HERBERT F. DIES
BY FINN G. OLSEN
ATTORNEY

April 24, 1962     H. F. DIES     3,031,232
WHEEL COVER
Filed Nov. 12, 1958     2 Sheets-Sheet 2
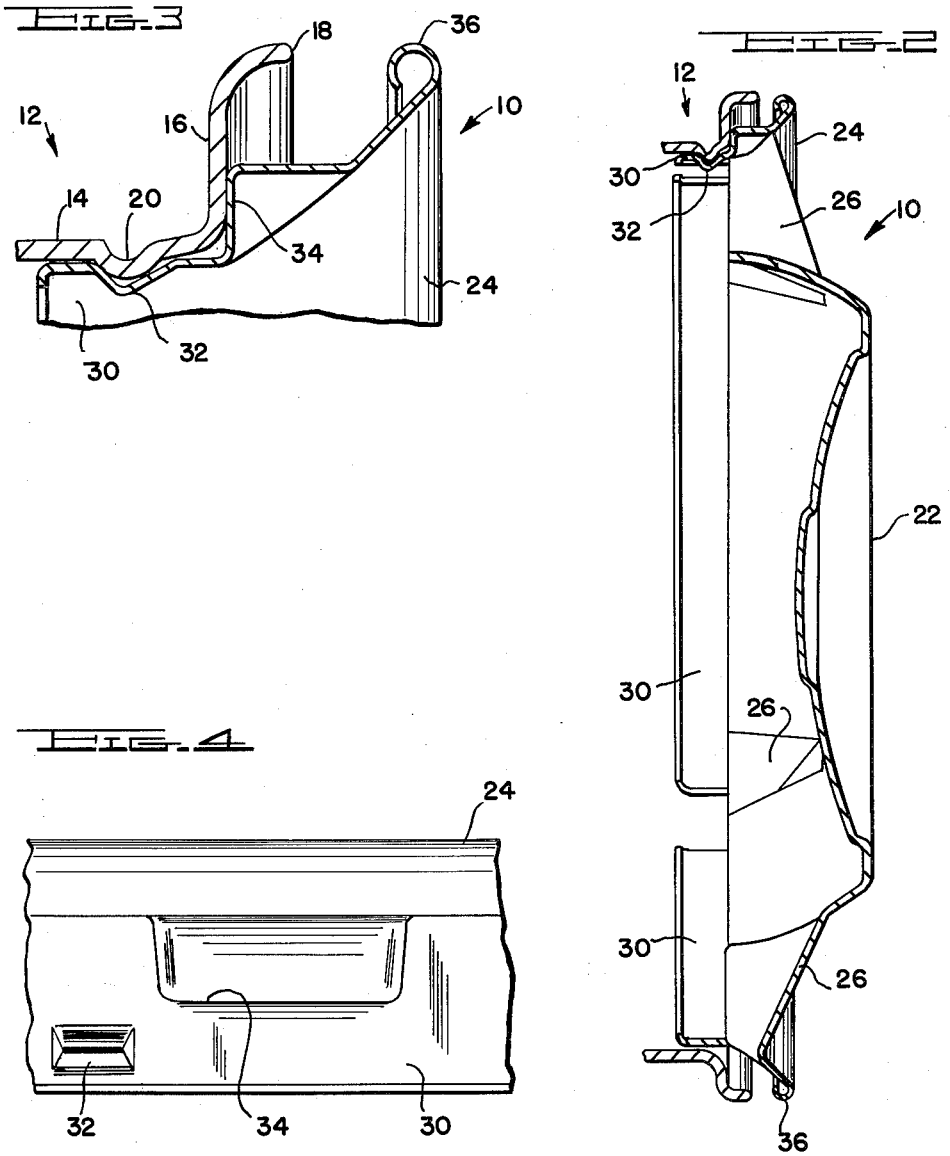
INVENTOR.
HERBERT F. DIES
BY FINN G. OLSEN
ATTORNEY

United States Patent Office 3,031,232
Patented Apr. 24, 1962

3,031,232
WHEEL COVER
Herbert F. Dies, Detroit, Mich., assignor to Hurd Lock & Manufacturing Co., Detroit, Mich., a corporation of Michigan
Filed Nov. 12, 1958, Ser. No. 773,272
8 Claims. (Cl. 301—37)

The present invention relates to wheel structures and more particularly to full wheel covers adapted to be disposed over the wheel and rim of the wheel structure.

It is an object of the present invention to provide an improved full wheel cover which is constructed and arranged so that minimum material will be required in manufacturing the cover while providing optimum results with respect to retaining the cover on the wheel in press-on, pry-off relation.

It is another object of the present invention to provide an improved full wheel cover of the foregoing character wherein air circulation openings are formed in the exposed side of the cover and the material of the openings is used to retain the cover on the wheel and to function as anti-turn means preventing relative rotation of the cover with respect to the wheel.

It is still another object of the present invention to provide an improved wheel structure having a wheel cover of the foregoing character wherein one of the wheel parts has radially projecting bumps and the material from the openings in the cover has pockets which seat on said bumps for cooperating in retaining the cover on the wheel part and to prevent relative rotation between these assembled parts.

It is still another object of the present invention to provide a sheet metal full wheel cover utilizing a minimum amount of material which has a simulated spoke construction.

It is still another object of the present invention to provide a full wheel cover which includes means for limiting the extent to which the cover can be pressed axially inwardly on the wheel, said means also functioning to cooperate in clampingly engaging the wheel for retaining the cover on the wheel.

It is still another object of the present invention to provide a full wheel cover characterized by its low cost, its attractive appearance and its ability to give optimum results with respect to its retention means for holding the cover on the wheel in press-on, pry-off relation.

It is still another object of the present invention to provide a full wheel cover which retainingly engages the rim of the wheel without scratching or removing the paint on said wheel rim, thereby eliminating a rust problem which otherwise exists after installing and removing the cover a number of times.

It is still another object of the present invention to provide a wheel cover of the foregoing character wherein each of the associated clamping portions of the cover are circumferentially spaced so as to provide mechanical couples which utilize the spring properties of the material of the cover to clamp firmly certain portions of the wheel.

It is still another object of the present invention to provide wheel cover retaining means of the foregoing character wherein some of the mechanical couples clampingly engage the wheel portions in a clockwise sense and other of the mechanical couples clampingly engage the wheel portions in a counter-clockwise sense.

Other objects of this invention will appear in the following description and appended claims, reference being had to the accompanying drawings forming a part of this specification wherein like reference characters designate corresponding parts in the several views.

In the drawings:
FIGURE 1 is a front elevation of a full wheel cover embodying the present invention;
FIGURE 2 is a section taken in the direction of the arrows on lines 2—2 of FIGURE 1, showing the cover assembled on a conventional tire rim of a wheel;
FIGURE 3 is an enlarged fragmentary section taken on the line 2—2 of FIGURE 1, showing the retention means for the cover; and
FIGURE 4 is an enlarged fragmentary view taken on the lines 4—4 of FIGURE 1, showing the retention means for the cover.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, a more detailed description of the invention will be given. The full wheel cover 10 is adapted to be applied to the outer side of a wheel including a multi-flange drop center type rim 12 such as is in common use. The latter has an intermediate or axial flange 14 and a radial outer or side flange 16 terminating in an axially extending end 18. A plurality of radially inwardly projecting protuberences or bumps 20 are formed in the axial flange 14. The bumps 20 may be of any suitable number, and in the illustrated embodiment of the invention, four are used. They are preferably circumferentially equidistantly spaced and have their inner portions arranged in a circle.

The cover 10 is illustrated in the form of a one-piece sheet metal construction comprising a central portion 22 and an annular portion 24 which are in radially spaced relation but integrally joined together by the radially extending spoke-like elements 26, six of which are present in the illustrated embodiment. Each of the spoke-like elements 26 is transversely arched, as can be seen in FIGURE 2, thereby assuring a rigid construction between the central portion 22 and the annular portion 24.

Between the spoke-like elements 26 and the central and annular portions 22 and 24 are a plurality of air circulation openings 28. The latter are formed in the space between the radially outer edge of the central portion 22 and the radially inner edge of annular portion 24 so as to form a plurality of circular flange segments 30 which form axially inward extensions from the radially inner edge of the annular portion 24. Thus, the circular flange segments 30 form a circular band interrupted only at the spoke-like elements 26.

The circular flange segments 30 are in a circle having a diameter slightly less than the internal diameter of the axial flange 14 of the tire rim 12. Thus, the circular flange segments 30 will be spaced from the axial flange 14 except at the four bumps 20 which project radially inwardly with their inner portions in a circle smaller than the diameter of the circle containing the circular flange segments 30. To receive these bumps 20, four of the segments 30 have radially inwardly depressed, outwardly opening pockets 32 which are located in an axial direction so that when the cover 10 is pressed onto the rim 12, their axially inner surface will seat on the axially inner side of the bumps 20, as can be seen best in FIGURE 3.

To limit the extent to which the cover 10 can be pressed axially inward on the rim 12, the annular portion 24 has adjacent its radially inner edge a plurality of axially inwardly depressed shoulder formations 34 which are adapted to seat on the side or radial flange 16 of the tire rim 12. In the present embodiment of the invention, one such shoulder formation 34 is centrally located between each pair of adjacent spoke-like elements 26.

In addition to functioning as inward limit stops for the cover 10, some of the shoulder formations 34 also cooperate in retainingly clamping the cover 10 onto the rim 12. Four of the shoulder formations 34 have circumferentially adjacent thereto pockets 32. The particular arrangement can be seen in FIGURES 1, 3 and 4. Since the shoulder formations limit the extent to which the pockets 32 can pass inwardly over the bumps 20, each pocket 32 and its associated or adjacent shoulder formation 34 clampingly engages the rim 12 through the bump 20 and the radial flange 16.

The associated pockets 32 and shoulder formations 34 are circumferentially displaced a limited distance so that in effect a mechanical couple is formed utilizing the spring properties of the sheet metal to clamp firmly onto the rim parts. Furthermore, alternate ones of the associated pockets 32 and shoulder formations 34 form, in effect, couples tending to turn in a clockwise direction and the others form, in effect, couples tending to turn in a counter clockwise direction. Thus, the holding forces are in static balance on the wheel rim 12.

The radially outer edge of the annular portion 24 is turned over or beaded, as at 36. The beaded edge 36 is spaced from, but overlies the terminal flange 18 of the rim 12. Thus, except for the pockets 32 and the shoulder formations 34, the cover 10 is completely spaced from the rim 12, and, in effect, is floatingly retained with air passageways therebetween, and by virtue of the openings 28, still other air passageways are provided for permitting cooling air to the wheel and its associated parts.

The cover 10 can be removed from the wheel assembly simply by inserting a pry-off tool between the cover 10 and the rim 12. The cover 10 can then be pried off by fulcruming the tool on the terminal flange 18 and pivoting the tool. This will cause the flange segments 30 which contain pockets 32 to be deflected radially inwardly while the pockets are passing over the bumps 20. The cover 10 is pressed on the rim 12 merely by aligning the pockets 32 with the bumps 20 and pressing the cover axially inwardly. When the pockets 32 are seated over the bumps 20, as shown in FIGURE 3, they will cooperate in gripping the rim 12, as explained above, and also will prevent rotation of the cover 10 with respect to the rim 12.

From the foregoing it can be understood that a cover 10 has been provided which can be made from a single piece of sheet metal and wherein the minimum amount of material will be used for fully covering a wheel assembly including the terminal flange of the rim 12. Ample air circulating means are provided and the cover 10 is retained on the rim 12 by novel holding means which perform the multiple functions of axial limit stops and anti-turn means as well as clamping means. Furthermore, these holding means will not abrade or otherwise mar the finish of the tire rim 12.

Having thus described my invention, I claim:

1. In a wheel structure including a wheel rim having radial flange and inward thereof an axial flange having a plurality of radially inwardly projecting bumps, a wheel cover for disposition over said wheel structure comprising an annular portion having a plurality of circumferentially spaced radially outwardly opening pockets formed therein fitting over said bumps and a plurality of radially extending flat surfaces formed in the annular portion circumferentially spaced from said pockets and seated on said radial flange, said pockets and said flat surfaces cooperating in clampingly engaging the rim to retain the cover thereon, said pockets and said flat surfaces being circumferentially spaced from one another with certain of said flat surfaces having a pocket adjacent only one side thereof.

2. In a wheel structure including a wheel body part and a rim part wherein one of said parts has an axially outwardly facing surface and adjacent thereto a radially facing surface including a plurality of bumps projecting radially therefrom, a wheel cover for disposition over said parts comprising a one-piece sheet metal disk having a central portion and adjacent thereto a radially outer annular portion, one of said portions having at its edge which is adjacent the other portion a plurality of circular segments deflected axially inwardly out of the material of said disk so as to form an axially inwardly extending flange interrupted at spaced intervals by spoke-like segments joining said portions, said flange having a plurality of pockets formed in its surface opening toward said bumps and fitting thereover, said one portion having a plurality of radially extending flat surfaces seated on said axially outwardly facing surface and cooperating with said pockets in clampingly engaging said one part, said pockets and said flat surfaces being circumferentially spaced from one another with certain of said flat surfaces having a pocket adjacent only one side thereof.

3. In a wheel structure including a wheel body part and a drop center type rim part wherein the intermediate axial flange has a plurality of radially inwardly projecting bumps, a wheel cover for disposition over said parts comprising a one-piece sheet metal disk having a central portion and adjacent thereto a radially outer annular portion, said radially outer annular portion having at its inner edge a plurality of circular segments deflected axially inwardly out of the material of said disk so as to form air circulation openings and so as to form an axially inwardly extending flange interrupted at spaced intervals by spoke-like segments joining said portions, said axially inwardly extending flange having a plurality of pockets formed in its surface opening toward said bumps and seated thereon with the remainder of the axially inwardly extending flange spaced from said intermediate flange, said radially outer annular portion being spaced axially outwardly of the outer radial flange of said rim and having a plurality of spaced axially inwardly deflected depressions seated on said radial flange and cooperating with said pockets in holding the cover on the rim, the spacing of the radially outer annular portion and the axially inwardly extending flange from the rim providing air circulation passageways between these members and the rim, said pockets and said depressions being circumferentially spaced with certain of said depressions having a pocket adjacent one side thereof only.

4. In a wheel structure including a wheel body and a tire rim having an intermediate axial flange with a plurality of radially inwardly projecting bumps and a radial flange outward thereof, a cover for disposition over the outer side of the wheel comprising a one-piece sheet metal member including a central portion overlying the wheel body and an annular portion overlying the tire rim and radially spaced from said central portion, said central and annular portions being connected by relatively rigid transversely arched spoke-like elements, and a circumferential series of axially inwardly extending flange segments interrupted only at said spoke-like elements and derived from material between said portions and being extensions from the radially inner edge of said annular portion, said annular portion having a plurality of axially inwardly depressed shoulder formations adjacent its radially inner edge seated on said radial flange to limit the extent to which the cover can be pressed on to the rim, said flange segments having radially outwardly opening pockets formed therein which fit over said bumps to function as anti-turn holding means and in cooperation with said shoulder formations to clampingly engage the axially inner sides of said bumps and the axially outer side of said radial flange, said shoulder formations exceeding in numbers said pockets and being circumferentially spaced therefrom with certain of said shoulder formations having a pocket adjacent to but circumferentially spaced therefrom and on only one side thereof.

5. In a wheel structure including a wheel body and a tire rim having an intermediate axial flange with a plurality of radially inwardly projecting bumps and a radial flange outward thereof, a cover for disposition over the outer side of the wheel comprising a one-piece sheet metal member including a central portion overlying the wheel body and an annular portion overlying the tire rim and radially spaced from said central portion, said central and annular portions being connected by relatively rigid transversely arched spoke-like elements, and a circumferential series of axially inwardly extending flange segments interrupted only at said spoke-like elements and derived from material between said portions and being extensions from the radially inner edge of said annular portion, said annular portion having a plurality of axially inwardly depressed shoulder formations adjacent its radially inner edge seated on said radial flange to limit the extent to which the cover can be pressed on to the rim, said flange segments having radially outwardly opening pockets formed therein which fit over said bumps to function as anti-turn holding means and in cooperation with said shoulder formations to clampingly engage the axially inner sides of said bumps and the axially outer side of said radial flange, at least one of said shoulder formations being positioned between each pair of adjacent spoke-like elements and some of said pockets being positioned circumferentially on one side of their associated shoulder formations and some of the other pockets being positioned circumferentially on the other side of their associated shoulder formations.

6. In a wheel structure including a wheel body and a tire rim having an intermediate axial flange with a plurality of radially inwardly projecting bumps and a radial flange outward thereof, a cover for disposition over the outer side of the wheel comprising a one-piece sheet metal member including a central portion overlying the wheel body and an outwardly facing concave annular portion overlying the tire rim and radially spaced from said central portion, said central and annular portions being connected by a relatively few widely spaced rigid transversely arched spoke-like elements, and a circumferential series of axially inwardly extending flange segments forming a continuous band except for interruptions at said spoke-like segments and derived from material between said portions and being extensions from the radially inner edge of said annular portion, the diameter of said band being slightly less than the internal diameter of said intermediate axial flange, said annular portion having a plurality of axially inwardly depressed shoulder formations adjacent its radially inner edge seated on said radial flange to limit the extent to which the cover can be pressed on to the rim and to provide air openings between the cover and the radial flange, said flange segments having radially outwardly opening pockets depressed inwardly therein which fit over said bumps and seat thereon and in cooperation with said shoulder formations clampingly engage the axially inner sides of said bumps and the axially outer side of said radial flange, said shoulder formations exceeding in numbers said pockets and being circumferentially spaced therefrom with certain of said shoulder formations having a pocket adjacent to but circumferentially spaced therefrom and on only one side thereof.

7. In a wheel structure including a wheel part and a rim part wherein one of said parts has an axially outwardly facing surface and adjacent thereto a radially facing surface including a plurality of bumps projecting radially therefrom, a wheel cover for disposition over said parts so as to overlie the terminal flange of said rim part comprising a one-piece sheet metal member including a central portion overlying the wheel body, an annular portion overlying the tire rim with the radially outer edge of the annular portion overlying said terminal flange in spaced axial relation thereto, said portions being radially spaced and connected by relatively rigid spoke-like elements, and a circumferential series of axially inwardly extending flange segments interrupted only at said spoke-like elements and derived from material between said portions and being extensions from the edge of the one of said portions which overlies said one part, said one portion having a plurality of axially inwardly depressed shoulder formations adjacent its flanged edge seated on said axially outwardly facing surface to limit the extent to which the cover can be pressed on to the wheel, said flange segments having pockets opening radially so as to fit over said bumps and in cooperation with said shoulder formations to clampingly engage said one part, said shoulder formations exceeding in numbers said pockets and being circumferentially spaced therefrom with certain of said shoulder formations having a pocket adjacent to but circumferentially spaced therefrom and on only one side thereof.

8. In a wheel structure including a wheel part and a rim part wherein one of said parts has an axially outwardly facing surface and adjacent thereto a radially facing surface including a plurality of bumps projecting radially therefrom, a wheel cover for disposition over said parts so as to overlie the terminal flange of said rim part comprising a one-piece sheet metal member including a central portion overlying the wheel body, an annular portion overlying the tire rim with the radially outer edge of the annular portion overlying said terminal flange in spaced axial relation thereto, said portions being radially spaced and connected by relatively rigid spoke-like elements, and a circumferential series of axially inwardly extending flange segments interrupted only at said spoke-like elements and derived from material between said portions and being extensions from the edge of the one of said portions which overlies said one part, said one portion having a plurality of axially inwardly depressed shoulder formations adjacent its flanged edge seated on said axially outwardly facing surface to limit the extent to which the cover can be pressed on to the wheel, said flange segments having pockets opening radially so as to fit over said bumps and in cooperation with said shoulder formations to clampingly engage said one part, at least one of said shoulder formations being positioned centrally between each pair of adjacent spoke-like elements and some of said pockets being positioned circumferentially on one side of their associated shoulder formations and some of the other pockets being positioned circumferentially on the other side of their shoulder formations.

References Cited in the file of this patent

UNITED STATES PATENTS

| | | |
|---|---|---|
| 2,631,895 | Hunt | Mar. 17, 1953 |
| 2,725,257 | Maurer et al. | Nov. 29, 1955 |
| 2,757,977 | Lyon | Aug. 7, 1956 |
| 2,760,606 | Lyon | Aug. 28, 1956 |

FOREIGN PATENTS

| | | |
|---|---|---|
| 1,100,164 | France | Mar. 30, 1955 |
| 529,974 | Canada | Sept. 4, 1956 |
| 540,787 | Canada | May 14, 1957 |